(12) United States Patent
Wu

(10) Patent No.: US 12,025,265 B2
(45) Date of Patent: Jul. 2, 2024

(54) MULTI-FUNCTION SIDE HANDLE

(71) Applicant: SHENZHEN LEQI NETWORK TECHNOLOGY CO., LTD, Shenzhen (CN)

(72) Inventor: Yating Wu, Shenzhen (CN)

(73) Assignee: SHENZHEN LEQI NETWORK TECHNOLOGY CO., LTD., Shenzhen (CN)

( * ) Notice: Subject to any disclaimer, the term of this patent is extended or adjusted under 35 U.S.C. 154(b) by 413 days.

(21) Appl. No.: 17/505,622

(22) Filed: Oct. 20, 2021

(65) Prior Publication Data

US 2022/0042647 A1 Feb. 10, 2022

Related U.S. Application Data

(63) Continuation of application No. PCT/CN2020/086758, filed on Apr. 24, 2020.

(30) Foreign Application Priority Data

Apr. 26, 2019 (CN) .......................... 201920609008.6

(51) Int. Cl.
*F16M 11/00* (2006.01)
*F16M 13/04* (2006.01)
*G03B 17/56* (2021.01)

(52) U.S. Cl.
CPC ........... *F16M 13/04* (2013.01); *G03B 17/566* (2013.01)

(58) Field of Classification Search
CPC .... F16M 13/04; G03B 17/566; G03B 17/563; F16B 2/12
See application file for complete search history.

(56) References Cited

U.S. PATENT DOCUMENTS 4,795,118 A * 1/1989 Kosugi ................. F16M 11/14
403/138
6,384,863 B1 5/2002 Bronson
(Continued)

FOREIGN PATENT DOCUMENTS

| CN | 201903748 U | 7/2011 |
| CN | 208126086 U | 11/2018 |
| CN | 208689347 U | 4/2019 |

OTHER PUBLICATIONS

International Search Report issued in corresponding International application No. PCT/CN2020/086758, mailed Jul. 24, 2020.
(Continued)

*Primary Examiner* — Amy J. Sterling

(57) ABSTRACT

The present disclosure discloses a multi-function side handle including a handle body, a hand grip, a locking connector, and a fixing assembly configured to fix a solid state drive. The handle body is clamped in the hand grip, the handle body defines a plurality of through holes with each of the through holes provided with a bolt, and the bottom of the locking connector passes through any one of two avoiding holes of the hand grip to connect with the bolt. The bottom of the handle body is defined with a receiving groove for accommodating the solid state drive, and the fixing assembly is arranged under the receiving groove. The side handle is comfortable for holding and direction adjustable in using, and can connect with auxiliary accessories and carry solid state drives.

7 Claims, 4 Drawing Sheets

(56) References Cited

U.S. PATENT DOCUMENTS

| | | | |
|---|---|---|---|
| 10,772,311 B1* | 9/2020 | Ashikaga | A01K 87/06 |
| 2017/0064176 A1* | 3/2017 | Kim | H04N 23/66 |
| 2018/0376037 A1 | 12/2018 | Arai et al. | |
| 2019/0137852 A1* | 5/2019 | Li | F16M 11/205 |
| 2020/0177720 A1* | 6/2020 | Ferretti | F16M 13/04 |

OTHER PUBLICATIONS

Written Opinion of the International Searching Authority for No. PCT/CN2020/086758.

* cited by examiner

MULTI-FUNCTION SIDE HANDLE

FIELD OF THE DISCLOSURE

The present disclosure relates to the field of photographic equipment accessories, and more particularly to a multi-function side handle.

DESCRIPTION OF RELATED ART

Side handle in the prior art generally consists of a handle and a connecting portion connected to the handle, the connecting portion is located on the left or right side of the handle, and the position of the connecting portion on the handle cannot be adjusted to adapt the state during using. The side handle is used together with a camera for shooting which commonly needs solid state drives to expand the capacity of the camera to store more photos or videos. For going out shooting, users need to carry the solid state drives, which is not convenient. Further, the side handles in the prior art can hardly be connected to an external auxiliary equipment to use. In addition, the whole said side handle is commonly made of alloy, making it uncomfortable during holding by users.

Therefore, the prior art has defects and needs to be improved.

SUMMARY OF THE DISCLOSURE

The present disclosure aims to solve the problem mentioned above and provide a multi-function side handle which is comfortable to hold, direction adjustable, external accessories connectable, and solid state drives installable.

The technical solution of the present disclosure is as follows. A multi-function side handle includes a handle body, a hand grip, a locking connector, and a fixing assembly for fixing solid state drives. The hand grip has a shape like "U", and the handle body is clamped in the hand grip. The front and back sides of the hand grip respectively defines an avoiding hole, the handle body defines a plurality of through holes, each through hole is provided with a bolt, and the bottom of the locking connector passes through the avoiding hole to connect with the bolts. The bottom of the handle body is formed with a receiving groove for accommodating a solid state drive, and the fixing assembly is located under the receiving groove. The locking connector includes a connecting and fixing clip, a movable side part, and a first locking knob, the bottom of the connecting and fixing clip is connected with the bolt, the top of the connecting and fixing clip and the movable side part cooperatively form a sliding groove, and the first locking knob passes through the body of the movable side part and connect to the connecting and fixing clip.

In the multi-function side handle, the fixing assembly includes an elastic pressing plate, a second locking knob, and a rotating baffle. A first side of the elastic pressing plate is integrally formed with the handle body, a second side of the elastic pressing plate is connected to the handle body through the second locking knob, and the rotating baffle is located at the bottom of the handle body.

In the multi-function side handle, the movable side part is provided with two positioning pins, the first locking knob is located between the two positioning pins, and the connecting and fixing clip is defined with positioning holes matched with the positioning pins.

In the multi-function side handle, the hand grip is made of wood material.

In the multi-function side handle, the hand grip is defined with a plurality of grooves that are adapted to the fingers of users.

In the multi-function side handle, the handle body is made of aluminum alloy.

The present disclosure is provided with avoiding holes in the front and rear sides of the hand grip, so the locking connector may be connected to the front side or the back side of the side handle according to actual need in use, which is labor-saving and convenient for using. A receiving groove for receiving the solid state drive is arranged inside the handle body, so the solid state drive may be carried much more conveniently. In addition, a fixing assembly is also arranged at the bottom of the handle body to further improve the fixing of the solid state drive and prevent the solid state drive falling from the receiving groove. The hand grip is provided with grooves that are adapted to user's fingers and is made of wood material, which improves holding comfort. The whole side handle is light in weight, stable in structure, and convenient for using.

DETAILED DESCRIPTION OF THE EXEMPLARY EMBODIMENT

Figure 1:
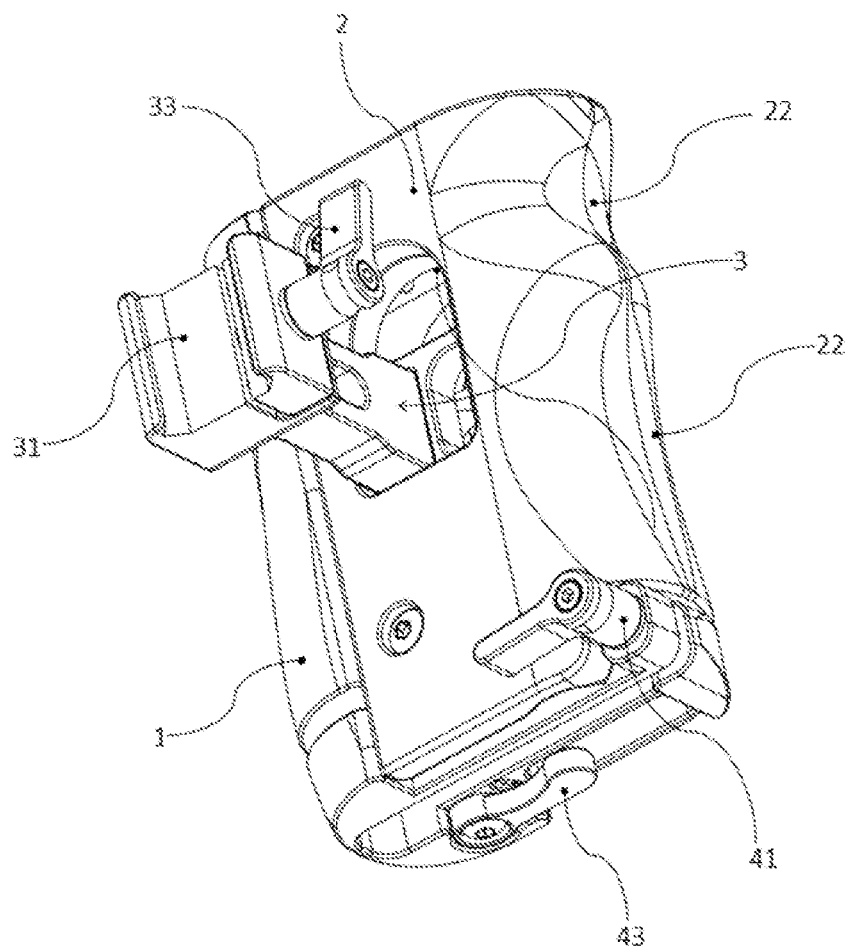
FIG. 1 is a front perspective view of a side handle according to an exemplary embodiment of the present disclosure.

The embodiment of the present disclosure will be clearly and completely described in the following with reference to the accompanying drawings.

Referring to FIG. 1 to FIG. 4, a multi-function side handle includes a handle body 1, a hand grip 2, a locking connector 3, and a fixing assembly for fixing solid state drives. The hand grip 2 has a shape like "U", and the handle body 1 is clamped in the hand grip 2. The front and back sides of the hand grip 2 respectively defines an avoiding hole 21, the handle body 1 defines a plurality of through holes 12, each through hole 12 is provided with a bolt 36, and the bottom of the locking connector 3 passes through the avoiding hole 21 to connect with the bolts 36. The bottom of the handle body 1 is formed with a receiving groove 11 for accommodating a solid state drive, and the fixing assembly is located under the receiving groove 11. The locking connector 3 includes a connecting and fixing clip 31, a movable side part 32, and a first locking knob 33, the bottom of the connecting and fixing clip 31 is connected with the bolt 36, the top of the connecting and fixing clip 31 and the movable side part 32 cooperatively form a sliding groove, and the first locking knob 33 passes through the body of the movable side part 32 and connect to the connecting and fixing clip 31.

Referring to FIG. 1, the handle body 1 is clamped in the hand grip 2, and the locking connector 3 is connected to the handle body 1. The locking connector 3 is configured to connect with a camera or other photographic equipment, and the camera or other photographic equipment may be operated during user's hand holding the hand grip 2. Further, in order to facilitate holding and avoid discomfort, the hand grip 2 is defined with a plurality of grooves 22 that are adapted to the fingers of the users. In an exemplary embodiment, the hand grip 2 is defined with two grooves 22 to adapt user's fingers, the index finger may be placed in an upper groove 22, and the middle finger, ring finger and little finger may be placed in a lower groove 22, so as to enhance holding stability. Further, the hand grip 2 is made of wood material, which may improve holding comfort of the hand during holding the hand grip 2. In addition, for a purpose of weight reducing, the handle body 1 is made of aluminum alloy. The handle body 1 made of aluminum alloy is lighter in weight, labor-saving while holding, and simultaneously has a sufficient structural strength so that would not be deformed even if a variety of accessories are connected to the handle body 1.

Figure 4:
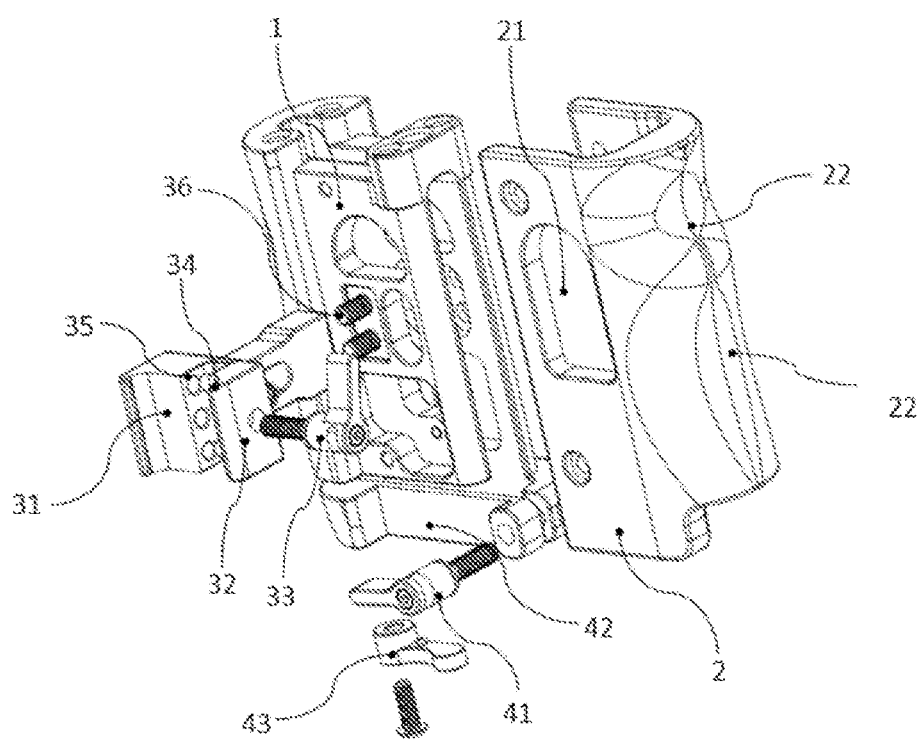
FIG. 4 is an exploded view of a side handle according to an exemplary embodiment of the present disclosure.

Referring to FIG. 1 and FIG. 4, the handle body 1 is defined with a plurality of through holes 12, each through hole 12 is provided with a bolt 36, and the bottom of the locking connector 3 passes through the avoiding hole 21 to connect with the bolts 36. The locking connector 3 is configured to connect with a camera or other photographic equipment. The locking connector 3 includes a connecting and fixing clip 31, a movable side part 32, and a first locking knob 33. The bottom of the connecting and fixing clip 31 is connected with the bolts 36, the top of the connecting and fixing clip 31 and the movable side part 32 cooperatively form a sliding groove, and the first locking knob 33 passes through the body of the movable side part 32 to connect with the connecting and fixing clip 31. The sliding groove is configured to match with a protrusion of the camera or other photographic equipment to achieve a stable connection between the locking connector 3 and the camera or other photographic equipment. During connecting the camera to the locking connector 3, the first locking knob 33 is turned counterclockwise to loosen the movable side part 32, the protrusion of the camera slides into the sliding groove, and then the first locking knob 33 is turned clockwise to reduce the distance between the movable side part 32 and the connecting and fixing clip 31, as a result the width of the sliding groove is shortened, thereby completing the fixing of the camera. The structure described above is simple, and is convenient for users to use.

Figure 2:
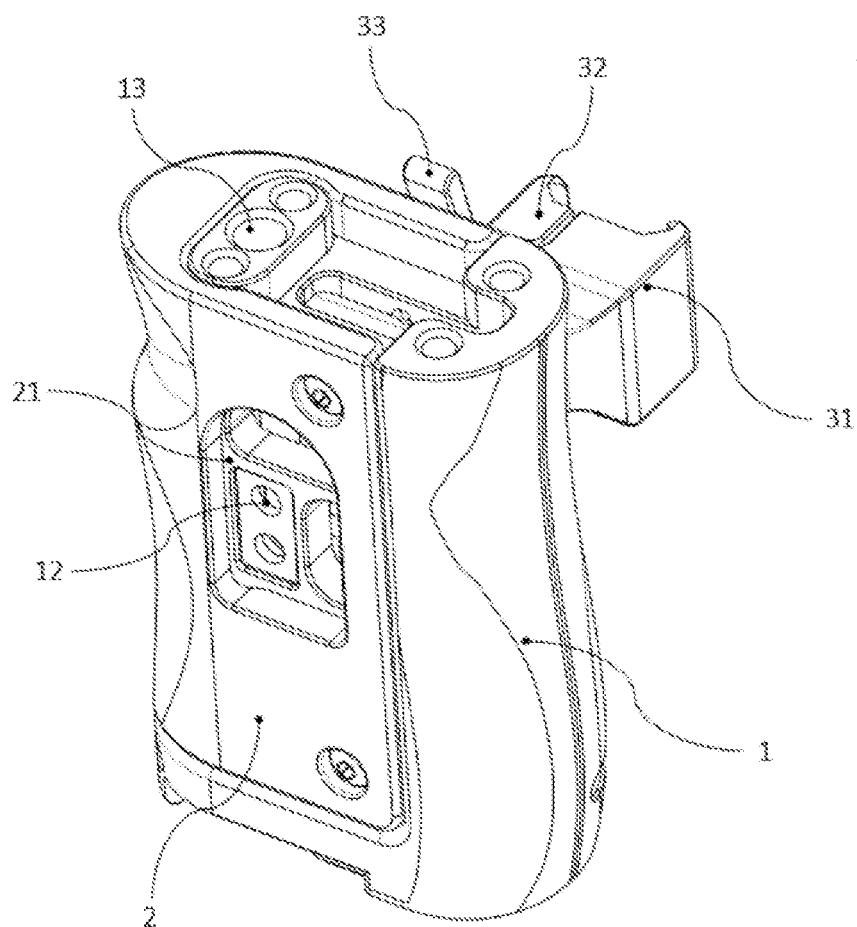
FIG. 2 is a back perspective view of a side handle according to an exemplary embodiment of the present disclosure.

Referring to FIG. 1 and FIG. 2, the position of the locking connector 3 on the side handle may also be adjustable for facilitating grip and labor-saving. The front and back sides of the hand grip 2 are respectively defined with an avoiding hole 21, and the head of the connecting and fixing clip 31 passes through any one of the avoiding holes 21 to connect with the bolts 36. In an exemplary embodiment, in case the connecting and fixing clip 31 is installed on the front side of the handle body 1, the bolts may be adjusted by an adjusting wrench from the avoiding hole 21 in the rear side of the hand grip 2; in case the connecting and fixing clip 31 is installed on the back side of the handle body 1, the bolts may be adjusted by the adjusting wrench from the avoiding hole 21 in the front side of the hand grip 2. The position of the connecting and fixing clip 31 mounting on the side handle is adjustable, so that it is convenient for users to select a suitable position to install the connecting and fixing clip 31 to facilitate holding the side handle. Further, the structure described is also convenient to disassemble and assemble.

Referring to FIG. 4, in order to improve the stability of the connection between the locking connector 3 and the camera, the movable side part 32 is provided with two positioning pins 34, the first locking knob 33 is located between the two positioning pins 34, and the connecting and fixing clip 31 is defined with positioning holes 35 that are matched with the positioning pins 34 to enhance the connection between the connecting and fixing clip 31 and the movable side part 32, therefore, the sliding groove formed by the connecting and fixing clip 31 and the movable side part 32 is more stable, and a higher installing stability of the protrusion matched to the camera will be achieved in the sliding groove.

Figure 3:
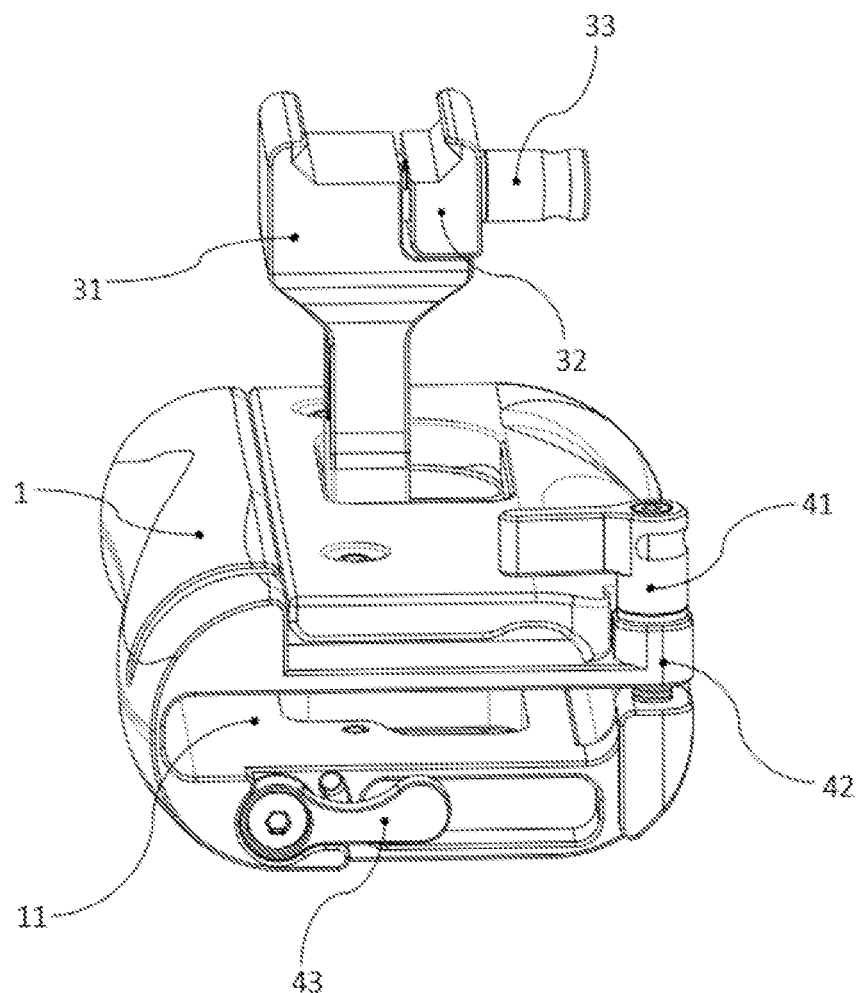
FIG. 3 is a bottom perspective view of a side handle according to an exemplary embodiment of the present disclosure.

Referring to FIG. 3, the bottom of the handle body 1 is defined with a receiving groove 11 for accommodating a solid state drive that is put into the receiving groove 11 by users. A fixing assembly for fixing the solid state drive is arranged under the receiving groove 11 to hold the solid state drive and prevent the solid state drive escaping from the receiving groove 11. Preferably, the fixing assembly includes an elastic pressing plate 42, a second locking knob 41, and a rotating baffle 43. A first side of the elastic pressing plate 42 is integrally formed with the handle body 1, a second side of the elastic pressing plate 42 is connected to the handle body 1 through the second locking knob 41, and the rotating baffle 43 is located at the bottom of the handle body 1. When the solid state drive is needed to be clamped, just turn the second locking knob 41 clockwise, making the distance between the elastic pressing plate 42 and the handle body 1 reduce and the solid state drive be pressed by the elastic pressing plate 42, thus the solid state drive is clamped. The rotating baffle 43 is arranged at the bottom of the handle body 1 to prevent the solid state drive from falling caused by an accidentally loosening of the second locking knob 41. When the solid state drive is clamped, the rotating baffle 43 is then turned to a middle position corresponding to the receiving groove 11, in case the second locking knob 41 is loosened, the solid state drive may still be supported by the rotating baffle 43, thus improves the reliability and safety of fixing the solid state drive.

Referring to FIG. 2, in an exemplary embodiment, a plurality of screw holes 13 are provided in the top of the handle body 1 to meet the needs of connecting other auxiliary accessories. The screw holes 13 are configured to connect with auxiliary accessories through bolts.

The present disclosure is provided with avoiding holes in the front and rear sides of the hand grip, so the locking connector may be connected to the front side or the back side of the side handle according to actual need in use, which is labor-saving and convenient. A receiving groove for receiving the solid state drive is arranged inside the handle body, so the solid state drive may be carried much more conveniently. In addition, a fixing assembly is also arranged at the bottom of the handle body to further improve the fixing of the solid state drive and prevent the solid state drive falling from the receiving groove. The hand grip is provided with grooves adapted to user's fingers and is made of wood material, which further improves holding comfort. The whole side handle is light in weight, stable in structure, and convenient for using.

It is to be understood, however, that the above are only illustrative embodiment of the present disclosure and are not used to limit the disclosure. Any modification, equivalent replacement and improvement made within the spirit and principle of the disclosure will fall within the scope of the disclosure.

What is claimed is:
1. A multi-function side handle, comprising:
a handle body, a hand grip, a locking connector, and a fixing assembly configured to fix a solid state drive; the hand grip being U shaped, the handle body being clamped in the hand grip, the bottom of the handle body being defined with a receiving groove for accommo- dating the solid state drive, and the fixing assembly being arranged under the receiving groove;

wherein the locking connector comprises a connecting and fixing clip, a movable side part, and a first locking knob, the bottom of the connecting and fixing clip is connected with a bolt, the top of the connecting and fixing clip and the movable side part cooperatively form a sliding groove, and the first locking knob passes through the movable side part and connect to the connecting and fixing clip.

2. The multi-function side handle according to claim 1, wherein the front side and back side of the hand grip respectively defines an avoiding hole, the handle body defines a plurality of through holes, each through hole is provided with a bolt, and the bottom of the locking connector passes through the avoiding hole to connect with the bolts.

3. The multi-function side handle according to claim 1, wherein the fixing assembly comprises an elastic pressing plate, a second locking knob, and a rotating baffle, a first side of the elastic pressing plate is integrally formed with the handle body, a second side of the elastic pressing plate is connected to the handle body by the second locking knob, and the rotating baffle is located at the bottom of the handle body.

4. The multi-function side handle according to claim 1, wherein the movable side part is provided with two positioning pins, the first locking knob is located between the two positioning pins, and the connecting and fixing clip is defined with positioning holes matched with the positioning pins.

5. The multi-function side handle according to claim 1, wherein the hand grip is made of wood material.

6. The multi-function side handle according to claim 1, wherein the hand grip is defined with a plurality of grooves adapted to the fingers of users.

7. The multi-function side handle according to claim 1, wherein the handle body is made of aluminum alloy.

* * * * *